United States Patent
Terry et al.

(10) Patent No.: US 6,624,266 B2
(45) Date of Patent: Sep. 23, 2003

(54) COMPOSITIONS AND METHODS OF USING PREACTIVATED UNSUPPORTED CATALYST COMPOSITIONS HAVING A GIVEN CONCENTRATION

(75) Inventors: Kersten Anne Terry, South Charleston, WV (US); Jody Michael Moffett, Charleston, WV (US); William George Sheard, Houston, TX (US)

(73) Assignee: Union Carbide Chemicals & Plastics Technology Corporation, Midland, MI (US)

( * ) Notice: Subject to any disclaimer, the term of this patent is extended or adjusted under 35 U.S.C. 154(b) by 209 days.

(21) Appl. No.: 09/777,244

(22) Filed: Feb. 5, 2001

(65) Prior Publication Data

US 2001/0034299 A1 Oct. 25, 2001

Related U.S. Application Data

(63) Continuation-in-part of application No. 09/222,638, filed on Dec. 30, 1998, now abandoned.

(51) Int. Cl.[7] .............................. C08F 4/64; C08F 2/34; C08F 4/642
(52) U.S. Cl. ......................... 526/160; 526/70; 526/88; 526/901; 526/919
(58) Field of Search .......................... 526/70, 88, 160, 526/901, 919

(56) References Cited

U.S. PATENT DOCUMENTS

| | | |
|---|---|---|
| 5,240,894 A | 8/1993 | Burkhardt et al. |
| 5,317,036 A * | 5/1994 | Brady, III et al. ........... 523/223 |

FOREIGN PATENT DOCUMENTS

| | | |
|---|---|---|
| EP | 0 302 424 | 2/1989 |
| EP | 0 485 822 | 5/1992 |
| EP | 0 545 140 | 6/1993 |
| EP | 0 545 303 | 6/1993 |
| EP | 0 593 083 | 4/1994 |
| EP | 0 646 604 | 4/1995 |
| EP | 0 662 484 | 7/1995 |
| EP | 0 826 699 | 3/1998 |
| WO | WO 97/46599 | * 12/1997 |

OTHER PUBLICATIONS

U.S. patent application Ser. No. 09/223,399, Erickson et al., filed Dec. 30, 1998.

* cited by examiner

*Primary Examiner*—David W. Wu
*Assistant Examiner*—R. Rabago

(57) ABSTRACT

Preactivated unsupported catalyst compositions methods of using them are disclosed whereby the compositions have a concentration of preactivated catalyst of at least about 0.04 mmol of preactivated catalyst per liter of solution when using aliphatic or alicyclic hydrocarbon solvents, and a concentration of less than about 0.80 mmol/liter when using aromatic or halogen-substituted solvents. In the method, an unsupported catalyst precursor first is contacted with an activator, or co-catalyst, in a suitable reaction medium, and then the resulting mixture is contacted with additional solvent to form a preactivated unsupported olefin polymerization catalyst composition that can be fed to a gas phase polymerization reactor without plugging the catalyst injection nozzle. Combining the unsupported catalyst precursor, the co-catalyst and then adding additional solvent to provide such a composition prevents tube plugging, and provides a catalyst material that has high activity, avoids forming significant amounts of polymer agglomerates, and avoids reactor fouling.

6 Claims, No Drawings

COMPOSITIONS AND METHODS OF USING PREACTIVATED UNSUPPORTED CATALYST COMPOSITIONS HAVING A GIVEN CONCENTRATION

This is a continuation-in-part of Ser. No. 09/222,638 filed Dec. 30, 1998 now abandoned.

BACKGROUND OF THE INVENTION

1. Field of the Invention

The present invention relates to preactivated unsupported catalyst compositions and to methods of using them whereby the compositions have a concentration of preactivated catalyst within the range of from about 0.04 to about 0.1 mmol of preactivated catalyst per liter of solution when using aliphatic or alicyclic hydrocarbon solvents, and a concentration of less than about 0.80 mmol/liter when using aromatic or halogen-substituted solvents. In the method, an unsupported catalyst precursor first is contacted with an activator, or co-catalyst, in a suitable reaction medium, and then the resulting mixture is contacted with additional solvent to form a preactivated unsupported olefin polymerization catalyst composition that can be fed to a gas phase polymerization reactor without plugging the catalyst injection nozzle. Combining the unsupported catalyst precursor, the co-catalyst and then adding additional solvent to provide a composition having a concentration within the range of from about 0.04 to about 0.1 mmol/liter (using aliphatic or alicyclic hydrocarbon solvents) or less than about 0.80 mmol/liter (using aromatic or halogenated hydrocarbon solvents) prevents tube plugging, and provides a catalyst material that has high activity, avoids forming significant amounts of polymer agglomerates, and avoids reactor fouling.

2. Description of Related Art

Gas phase polymerization of olefin monomers to produce polyolefins is well known in the art. Various polyolefins can be produced including homopolymers, copolymers and terploymers of $\alpha$-olefins and optionally including dienes, aromatic compounds with vinyl unsaturation and/or carbon monoxide. A catalyst typically is required to initiate polymerization of one or more of the $\alpha$-olefin monomers, and the optional dienes, etc. Typical catalysts include, but are not limited to, coordinated anionic catalysts, cationic catalysts, free-radical catalysts, anionic catalysts and the like. As described more fully, inter alia, in U.S. Pat. Nos. 3,779,712, 3,876,602 and 3,023,203, these known catalysts are introduced to the reaction zone as solid particles whereby the active catalyst material is supported on an inert support typically made of alumina, silica and the like. It was generally known in the art that delivering conventional catalysts to a gas phase reactor that were unsupported would result in numerous problems in catalyst delivery, as well as undesirable polymer properties.

Recent developments in the industry, however, have led to the discovery of a class of unsupported catalysts, some of which are typically referred to as metallocenes, or single site catalysts. Delivery of liquid, unsupported catalysts to a gas phase reactor was first described in Brady et al., U.S. Pat. No. 5,317,036, the disclosure of which is incorporated herein by reference in its entirety. Brady recognized disadvantages of supported catalysts including, inter alia, the presence of ash, or residual support material in the polymer which increases the impurity level of the polymer, and a deleterious effect on catalyst activity because not all of the available surface area of the catalyst comes into contact with the reactants. Brady further described a number of advantages attributable to delivering a catalyst to the gas phase reactor in liquid form.

These advantages included a cost savings since there were no costs associated with providing the support material, and processing the support so as to impregnate the active catalyst thereon. In addition, a high catalyst surface area to volume ratio was achieved thereby resulting in improved catalytic activity. Moreover, it was more efficient since the catalytic solid no longer needed to be separated and processed (filtered, washed, dried, etc.), and then handled and transported.

Despite these advantages, the solid catalytic material still needed to be dissolved in a suitable solvent and delivered to the gas phase reactor in the solvent. Many, if not all, of the single site metallocene catalysts which may polymerize olefins, and especially propylene isotactically, such as metallocene dichlorides, are difficult to use because they are insoluble in hydrocarbon solvents such as alkanes. Other unsupported catalysts that may polymerize olefins also are not readily soluble in hydrocarbon solvents, or require significant amounts of hydrocarbon to dissolve the unsupported catalysts. Solvents such as toluene and methylene chloride, although capable of solvating such catalysts, are undesirable because they are toxic in nature and leave undesirable residues. Even in these types of solvents, however, solubilities still can be very low, typically less than 21 mmol/l in concentration at room temperature. In addition, feeding unsupported catalysts to a gas phase reactor using large quantities of solvents (hydrocarbon or otherwise) can cause reactor fouling to occur, as described, for example, in U.S. Pat. No. 5,240,894.

In addition, when a liquid catalyst is employed in gas phase polymerization, several phenomena can occur. First, the soluble or liquid catalyst tends to deposit on the resin or polymer forming the fluidized bed which in turn leads to accelerated polymerization on the surface of the particles of the bed. As the coated resin particles increase in size, they are exposed to a higher fraction of catalyst solution or spray because of their increased cross-sectional dimensions. If too much catalyst is deposited on the polymer particles, they can grow so large that they cannot be fluidized thereby causing reactor shut down.

Second, using liquid catalyst under conditions of high catalyst activity, e.g., a liquid metallocene catalyst, the initial polymerization rate is often so high that the newly formed polymer or resin particles can soften or melt, adhering to larger particles in the fluidized bed. This needs to be avoided or minimized to avert reactor shutdown.

On the other hand, if the polymer particle size is too small, entrainment can occur resulting in fouling of the recycle line, compressor, and cooler and increased static electricity can occur leading to sheeting,—and ultimately, reactor shut down.

It also was generally thought in the art that introduction of liquid catalyst to a gas phase polymerization would result in small particle sizes, cause undesirable swelling of the polymer or, at the very least, cause aggregation and agglomeration in the particle bed. This agglomeration would undesirably not fluidize well. Agglomerates would plug the product discharge valve, coat the walls of the reactor and form sheets, disrupt the flow of solids and gas in the bed, and generate large chunks that may extend throughout the reactor. Large agglomerates also can form at the point of introduction of the liquid catalyst and plug the catalyst injection nozzle or tube. This may be in part due to the excess amount of hydrocarbon needed to dissolve the unsupported catalysts. Moreover, carry over of excess liquid occurs, causing an undesirable catalyst coating of the walls of the heat exchanger and other downstream equipment with polymer.

It is known to contact single site catalysts that are soluble in hydrocarbons with a coactivating cocatalyst solution prior to administering the catalyst solution to the gas phase reactor, as described, inter alia, U.S. patent application Ser. Nos. 08/781,196 filed Jan. 10, 1997, now U.S. Pat. No. 5,912,202 and 08/782,499, filed Jan. 10, 1997, now abandoned, the disclosures of which are incorporated by reference herein in their entirety. The amount of hydrocarbon needed to dissolve the catalyst precursor, however, can be so high to result in an ultimate catalyst solution whose concentration is low enough to cause coating of existing resin particles in the gas phase reactor when the catalyst solution is introduced. This coating phenomenon forms undesirable agglomerates and "chunks" of polymer resin material. This problem is exacerbated when the unsupported catalyst is insoluble in hydrocarbons, or only slightly soluble in hydrocarbon solvent.

Preactivating an unsupported catalyst precursor with a co-catalyst may be sufficient to enhance the solubility of the unsupported catalyst, and serves to reduce the need to use toxic solvents, or high quantities of solvent. Plugging of the catalyst feed tube still may occur, however, if the concentration of the unsupported catalyst is too high. In addition, if the concentration of the unsupported catalyst is too low, too much liquid may be introduced into the reactor causing coating of the resin particles, as described above.

SUMMARY OF THE INVENTION

Thus, there exists a need to develop a mechanism by which unsupported catalysts can effectively be delivered to a gas phase polymerization reactor without causing the catalyst feed tube to plug. There also exists a need to develop methods of delivering unsupported catalysts to a gas phase reactor without causing polymer agglomeration, and without causing reactor fouling. It is therefore an object of the invention to provide an unsupported catalyst system and method of polymerization that does suffer from the aforementioned problems, and that satisfies the needs discussed above.

In accordance with these and other objects of the present invention, there is provided a preactivated unsupported olefin polymerization catalyst composition comprising an unsupported olefin polymerization catalyst precursor, a co-activator or co-catalyst and a solvent, whereby the concentration of the preactivated unsupported catalyst is within the range of from about 0.04 to about 0.1 mmol of catalyst per liter of solution when using an aliphatic or alicyclic hydrocarbon solvent, and the concentration is less than about 0.80 mmol/liter when using an aromatic or halogen-substituted solvent. In accordance with an additional object of the present invention, there is provided a method of making a polymer in a gas phase polymerization reactor comprising contacting, in the gas phase, an olefin monomer with the preactivated unsupported olefin polymerization catalyst composition in liquid form. These and other objects of the invention will be readily apparent to those skilled in the art upon review of the detailed description that follows.

DETAILED DESCRIPTION OF PREFERRED EMBODIMENTS

Throughout this description, the expression "liquid form" denotes solutions that contain the preactivated unsupported catalyst whereby the unsupported catalyst is dissolved therein, or is in the form of a slurry. Throughout this description, the term "polyolefin" denotes homopolymers, copolymers, and terpolymers of α-olefins and may optionally contain dienes, aromatic compounds with vinyl unsaturation and/or carbon monoxide.

It is preferred in the present invention that the unsupported catalyst precursor is insoluble in aliphatic or alicyclic hydrocarbons, or only slightly soluble therein. Throughout this description, the expression "unsupported catalyst precursor" denotes a catalytic solid material that is capable of polymerizing α-olefins (with or without a co-catalyst) without being supported on, inter alia, magnesium chloride, silica, magnesium ethoxide, and the like. Throughout this description, the expression "insoluble in hydrocarbon" or "slightly soluble in hydrocarbon" describes an unsupported catalyst that is either completely insoluble in aliphatic or alicyclic hydrocarbon solvents, or has a solubility, at room temperature and pressure, of less than 10 mmol per liter, preferably less than 1 mmol per liter, and most preferably less than 0.1 mmol per liter in aliphatic or alicyclic hydrocarbon solvents.

In addition, the expressions "preactivated unsupported catalyst," or "preactivated unsupported olefin polymerization catalyst" as they may be used herein interchangably, denote an unsupported catalyst precursor that has been contacted with a co-catalyst for a period of time sufficient to generate a catalytic material ("preactivated unsupported catalyst") that, when used to polymerize α-olefins, has an activity about the same or higher than the activity of the combination of unsupported catalyst precursors precursor and co-catalyst that were not contacted prior to injection into the reactor, or that were contacted for a period of time less than about 40 minutes. It is preferred to form a preactivated unsupported olefin polymerization catalyst by contacting an unsupported catalyst precursor and co-catalyst for a period of time sufficient to change the color of the reaction solution. Here, the unsupported catalyst precursors precursors were initially yellow to yellow-orange. After activation by contacting the unsupported precursor with a co-catalyst, the solution would turn orange-red to deep red. Solutions that remained yellow or only partially light orange were not very active and thus, were not considered to contain a sufficient amount of "preactivated unsupported catalyst."

In accordance with preferred embodiments of the present invention, the unsupported catalyst precursor and the co-catalyst (or "co-activator") are first contacted with one another, and then additional solvent is added, and the resulting mixture is reacted for more than about 40 minutes, but they can be reacted for as long as desired. That is, the solution containing the unsupported catalyst precursor and co-catalyst and additional solvent can be stored indefinitely. It is preferred, however, to use the solution containing the preactivated unsupported catalyst within less than about 3 months of storage, more preferably, less than 1 month, and most preferably, less than 1 week. In one preferred embodiment of the invention, the unsupported catalyst precursor and co-catalyst are reacted for greater than about 50 minutes, the solution then is passed through a filtering medium to remove any solids, and then the solution is stored for about 1 to about 10 days, preferably, from about 1 to about 6 days, and more preferably from about 1 to about 4 days.

It is preferred to contact the unsupported catalyst precursor and co-catalyst at temperatures within the range of from about −20 to about 80° C., preferably about 0 to about 60° C., and at pressures of up to about 300 psi, preferably, up to about 20 psi. Because it is preferred to inject the catalyst solution at higher dilution than that obtained simply by using the hydrocarbon solvent medium used to dissolve the co-catalyst, additional solvent typically is required. The present inventors have discovered, however, that it is preferred to contact the unsupported catalyst precursor and co-catalyst with one another first, and then add additional solvent to effectively prevent plugging of the catalyst injection tube.

In accordance with the present invention, if an aliphatic or alicyclic hydrocarbon solvent (i.e., methane, ethane, pentane, hexane, heptane, octane, etc.) is used to form the preactivated unsupported olefin polymerization catalyst composition, then additional hydrocarbon solvent is added to dilute the concentration of the pre activated unsupported olefin polymerization catalyst composition. Preferably, the preactivated unsupported olefin polymerization catalyst is present in a concentration within the range of from about 0.04 to about 0.1 mmol of catalyst per liter of solution. More preferably, the unsupported preactivated polymerization catalyst is present in a concentration within the range of from about 0.045 to about 0.07, and most preferably within the range of from about 0.048 to about 0.07.

In accordance with the present invention, if an aromatic or halogen-substituted solvent is used (i.e., toluene, xylene, methylene chloride) to form the preactivated unsupported olefin polymerization catalyst composition, then additional solvent is not needed. Preferably, the preactivated unsupported olefin polymerization catalyst is present in a concentration within the range of from about 0.01 to about 0.8 mmol of catalyst per liter of solution. More preferably, the unsupported preactivated polymerization catalyst is present in a concentration within the range of from about 0.05 to about 0.75, and most preferably within the range of from about 0.1 to about 0.70 mmol/liter.

The present inventors have found that it is advantageous to control the concentration of the preactivated unsupported olefin polymerization catalyst composition within the ranges noted above. In general, a more concentrated solution is desirable so that liquid solvent evaporates rapidly in the reactor, preferably before contacting resin particles, and polymerization begins around the catalyst particles to form fresh resin particles. While not intending on being bound by any theory, the inventors believe that if the concentration is too low, the composition is sprayed onto existing resin particles causing additional polymer to grow on the particles creating larger and larger particles. This ultimately leads to polymer agglomeration, aggregation and plugging, and renders the gas phase polymerization inoperable. If the concentration of the preactivated unsupported olefin polymerization catalyst is too high, however, the solid material may settle out of solution or crystallize immediately upon evaporation of minor amounts of solvent thereby causing plugging of the catalyst injection tube.

The inventors found that when an aliphatic or alicyclic hydrocarbon solvent is used to prepare the preactivated unsupported olefin polymerization catalyst composition, the concentration of the preactivated catalyst should be lower than when an aromatic or halogen-substituted solvent is used. While not intending on being bound by any theory, the inventors believe that the concentration of preactivated catalyst in aromatic or halogenated hydrocarbon solvents can be higher because the solubility of the preactivated catalyst is much higher in such solvents. Solvents that improve the solubility of the preactivated catalyst therein are preferably used in the invention. As an alternative, means for increasing the solubility in a particular solvent, e.g., preactivation, also are useful in the present invention.

Gas phase polymerization reactions typically are carried out in fluidized bed reactors and stirred or paddle-type reaction systems. While the following discussion will feature fluidized bed systems, where the present invention has been found to be preferred and especially advantageous, it is understood that the general concepts relating to the use of a preactivated unsupported catalyst in liquid form are also applicable to the stirred or paddle-type reaction systems as well. Those skilled in the art will appreciate that the present invention is not limited to any specific type of gas phase reaction system and can be carried out in a stirred or fluidized bed reactor. The invention can be carried out in a single reactor or multiple reactors (two or more reactors in series). In addition to well known conventional gas phase polymerizations processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Condensed mode polymerizations are disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

Liquid monomer polymerization mode is disclosed, in U.S. Pat. No. 5,453,471, U.S. Ser. No. 08/510,375, now U.S. Pat. No. 5,834,571, PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer processes are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

Fluidized bed gas phase reaction systems are described, for example, in Brady, et al., U.S. Pat. No. 5,317,036. As described therein, a conventional fluidized bed process for producing resins is conducted by passing a gaseous stream containing one or more monomers continuously through a fluidized bed reactor under reactive conditions and in the presence of catalyst at a velocity sufficient to maintain the bed of solid particles in a suspended condition. The gaseous stream containing unreacted gaseous monomer is withdrawn from the reactor continuously, compressed, cooled, optionally condensed, and recycled into the reactor. Product is withdrawn from the reactor and make-up monomer is added to the recycle stream.

The reaction zone of the gas phase polymerization fluidized bed reactor typically comprises a bed of growing polymer particles, formed polymer particles and a minor amount of catalyst all fluidized by the continuous flow of polymerizable and modifying gaseous components, including inerts, in the form of make-up feed and recycle fluid throughout the reaction zone. To maintain a viable fluidized bed, the superficial gas velocity through the bed typically must exceed the minimum flow required for fluidization which is typically from about 0.1 to about 0.8 ft/sec. Preferably, the superficial gas velocity is at least 0.2 ft/sec above the minimum flow for fluidization, or from about 0.3 to about 0.7 ft/sec. Ordinarily, the superficial gas velocity will not exceed 5.0 ft/sec and is usually no more than about 2.5 ft/sec.

During start up, the reactor generally is charged with a bed of particulate polymer particles before initiation of gas flow. These particles help to prevent the formation of localized 'hot spots' when catalyst feed is initiated. They may be the same as the polymer to be formed or different. When different, they are withdrawn with the desired newly formed polymer particles as the first product. Eventually, a fluidized bed consisting of desired polymer particles supplants the start-up bed.

Fluidization typically can be achieved by utilizing a high rate of fluid recycled to and through the bed, usually on the order of about 50 times the rate of feed or make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area.

Unreacted gas flowing through the fluidized bed generally is passed upwardly into a velocity reduction zone above the bed where a portion of the entrained particles drop back onto the bed thereby reducing solid particle carryover. All or only a portion of the unreacted gas then can be recycled to the reactor by compressing and condensing the gas, and then introducing the recycle stream to the reactor.

The monomers that can be used for preparing the polymers of the invention are an olefin monomer capable of being polymerized, and preferably are those olefin monomers having from two to twelve carbon atoms, more preferably those olefin monomers having two to six carbon atoms. Preferred monomers are ethylene, propylene, butene-1, pentene-1,4-methylpentene-1 and hexene-1.

The polymers of the present invention also can include dienes, aromatic compounds with vinyl unsaturation and/or carbon monoxide. Preferred dienes are non-conjugated or conjugated diene monomers that are straight chain, branched chain or cyclic hydrocarbon dienes having from about 5 to about 15 carbon atoms. Particularly preferred dienes include 1,4-hexadiene and 5-ethylidene-2-norbornene. Preferred aromatic compounds with vinyl unsaturation that also may be polymerized include styrene and substituted styrene. Particularly preferred polymers that can be made in accordance with the present invention include ethylene homopolymers and ethylene copolymers employing one or more $C_3$–$C_{12}$ alpha olefins; propylene homopolymers and propylene copolymers employing one or more $C_4$–$C_{12}$ alpha olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like.

The process of the present invention may employ any suitable additive necessary to effect, assist or otherwise complement the polymerization. For example, the process of the invention can optionally employ inert particulate materials as fluidization aids. These inert particulate materials can include carbon black, silica, talc, and clays, as well as inert polymeric materials. Carbon black has a primary particle size of about 10 to about 100 nanometers, an average size of aggregate of about 0.1 to about 10 microns, and a specific surface area of about 30 to about 1,500 $m^2$/gm. Silica has a primary particle size of about 5 to about 50 nanometers, an average size of aggregate of about 0.1 to about 10 microns, and a specific surface area of about 50 to 500 $m^2$/gm. Clay, talc, and polymeric materials have an average particle size of about 0.01 to about 10 microns and a specific surface area of about 3 to 30 $m^2$/gm. These inert particulate materials are employed in amounts ranging about 0.3 to about 80%, preferably about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives can be, and often are, employed in the polymerization process of the invention. Chain transfer agents are often used to control polymer molecular weight. Examples of these compounds are hydrogen and metal alkyls of the general formula $M^3R^5_g$, where $M^3$ is a Group IA, IIA or IIIA metal, $R^5$ is an alkyl or aryl, and g is 1, 2, or 3. Preferably, a zinc alkyl is employed; and, of these, diethyl zinc is most preferred. Typical promoters include halogenated hydrocarbons such as $CHCl_3$, $CFCl_3$, $CH_3CCl_3$, $CF_2ClCCl_3$, and ethyltrichloroacetate. Such promoters are well known to those skilled in the art and are disclosed in, for example, U.S. Pat. No. 4,988,783. Other organometallic compounds such as scavenging agents for poisons may also be employed to increase catalyst activity. Examples of these compounds include metal alkyls, such as aluminum alkyls, most preferably triusobutylaluminum. Some compounds may be used to neutralize static in the fluidized-bed reactor, others known as drivers rather than antistatic agents, may consistently force the static to from positive to negative or from negative to positive. The use of these additives is well within the skill of those skilled in the art. These additives may be added to the reaction zone separately or independently from the liquid catalyst if they are solids, or as part of the catalyst provided they do not interfere with the catalyst delivery. To be part of the catalyst solution, the additives should be liquids or capable of being dissolved in the catalyst solution.

Exemplary catalysts useful in the present invention are any unsupported catalyst useful for preparing polyolefins from olefin monomers, and preferably, unsupported catalysts that are insoluble or only slightly soluble in hydrocarbon solvents. A single catalyst may be used, or a mixture of catalysts may be employed if desired. These catalysts typically are used with cocatalysts and promoters well known in the art. Examples of suitable catalysts include:

A. Ziegler-Natta catalysts, including titanium based catalysts such as those described in U.S. Pat. Nos. 4,376,062 and 4,379,758, the disclosures of which are incorporated by reference herein in their entirety. Ziegler-Natta catalysts are well known in the art, and typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904, the disclosure of which is incorporated herein in its entirety.

C. Vanadium based catalysts such as vanadium oxychloride and vanadium acetylacetonate, such as described in U.S. Pat. No. 5,317,036, the disclosure of which is incorporated by reference herein in its entirety.

D. Metallocene catalysts described in, for example, U.S. Pat. Nos. 4,361,497 and 4,404,344 and in WO94/28219, the disclosures of which are incorporated by reference herein in their entirety.

E. Cationic forms of metal halides, such as aluminum trihalides.

F. Cobalt catalysts and mixtures thereof such as those described in U.S. Pat. Nos. 4,472,559 and 4,182,814, the disclosures of which are incorporated by reference herein in their entirety.

G. Nickel catalysts and mixtures thereof such as those described in U.S. Pat. Nos. 4,155,880 and 4,102,817, the disclosures of which are incorporated by reference herein in their entirety.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. Neodymium compounds, particularly neodymium neodecanoate, octanoate, and versatate, are the most preferred rare earth metal catalysts. Rare earth catalysts are used to produce polymers polymerized using butadiene or isoprene.

Preferred among these different catalyst systems are catalyst compositions comprising a mixture of at least one metallocene catalyst and an activating cocatalyst, whereby the resulting mixture is soluble in hydrocarbon solvent. The metallocene catalyst first is added to the activating co-catalyst solution (the co-catalyst typically being dissolved in a hydrocarbon solvent), and then additional solvent is added to further dilute the preactivated unsupported catalyst mixture. The practice of this invention is not limited to any particular class or kind of metallocene catalyst. Accordingly, the catalyst composition may comprise any unsupported metallocene catalyst useful in slurry, solution, bulk, or gas phase olefin polymerization. One or more than one metallocene catalyst may be employed. For example, as described in U.S. Pat. No. 4,530,914, the disclosure of which is incorporated by reference herein in its entirety, at least two metallocene catalysts may be used in a single catalyst composition to achieve a broadened molecular weight distribution polymer product.

Metallocene catalysts typically are organometallic coordination complexes of one or more π-bonded moieties in association with a metal atom from Groups IIIB to VIII or the rare earth metals of the Periodic Table.

Bridged and unbridged mono-, bis-, and tris-cycloalkadienyl/metal compounds are the most common metallocene catalysts, and generally are of the formula:

$$(L)_y R^1_z (L')MX_{(x-y-1)} \qquad (I)$$

wherein M is a metal from groups IIIB to VIII of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is a $C_1$–$C_4$ substituted or unsubstituted alkylene radical, a dialkyl or diaryl germanium or silicon, or an alkyl or aryl phosphine or amine radical bridging L and L'; each X is independently hydrogen, an aryl, alkyl, alkenyl, alkylaryl, or arylalkyl radical having 1–20 carbon atoms, a hydrocarboxy radical having 1–20 carbon atoms, a halogen, $R^2CO_2$—, or $R^2_2NCO_2$—, wherein each $R^2$ is a hydrocarbyl group containing 1 to about 20 carbon atoms; n and m are each 0, 1, 2, 3, or 4; y is 0, 1, or 2; x is 1, 2, 3, or 4 depending upon the valence state of M; z is 0 or 1 and is 0 when y is 0; and x-y □ is 1.

Illustrative but non-limiting examples of metallocene catalysts represented by formula II are dialkyl metallocenes such as bis(cyclopentadienyl)titanium dimethyl, bis(cyclopentadienyl)titanium diphenyl, bis(cyclopentadienyl)zirconium dimethyl, bis(cyclopenta-dienyl)zirconium diphenyl, bis(cyclopentadienyl)hafnium methyl and diphenyl, bis(cyclopentadienyl)titanium dineopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis (cyclopentadienyl)zirconium ethyl chloride, bis(cyclopentadienyl)zirconium phenyl chloride, bis(cyclopentadienyl)titanium methyl bromide; trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as, pentamethylcyclopentadienyl titanium trichloride, pentaethylcyclopentadienyl titanium trichloride; bis(pentamethylcyclopentadienyl)titanium diphenyl, the carbene represented by the formula bis(cyclopentadienyl)titanium=$CH_2$ and derivatives of this reagent; substituted bis(cyclopentadienyl)titanium (IV) compounds such as: bis(indenyl)titanium diphenyl or dichloride, bis(methylcyclopentadienyl)titanium diphenyl or dihalide; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl (cyclopentadienyl)(fluorenyl)zirconium dichloride, isopropyl (cyclopentadienyl)(octahydrofluorenyl)zirconium dichloride, diphenylmethylene (cyclopentadienyl)(fluorenyl)zirconium dichloride, diisopropylmethylene (cyclopentadienyl)(fluorenyl)-zirconium dichloride, diisobutylmethylene (cyclopentadienyl)(fluorenyl)zirconium dichloride, ditertbutylmethylene (cyclopentadienyl)(fluorenyl)zirconium dichloride, cyclohexylidene (cyclopentadienyl)(fluorenyl)zirconium dichloride, diisopropylmethylene (2,5-dimethylcyclopentadienyl)(fluorenyl)zirconium dichloride, isopropyl (cyclopentadienyl)(fluorenyl)hafnium dichloride, diphenylmethylene (cyclopentadienyl)(fluorenyl)hafnium dichloride, diisopropylmethylene (cyclopentadienyl)(fluorenyl)hafnium dichloride, diisobutylmethylene (cyclopentadienyl)(fluorenyl)hafnium dichloride, ditertbutylmethylene (cyclopentadienyl)(fluorenyl)hafnium dichloride, cyclohexylidene (cyclopentadienyl)(fluorenyl)hafnium dichloride, diisopropylmethylene (2,5-dimethylcyclopentadienyl)(fluorenyl)-hafnium dichloride, isopropyl (cyclopentadienyl)(fluorenyl)titanium dichloride, diphenylmethylene (cyclopentadienyl)(fluorenyl)titanium dichloride, diisopropylmethylene (cyclopentadienyl)(fluorenyl)titanium dichloride, diisobutylmethylene (cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene (2,5dimethylcyclopentadienyl fluorenyl)titanium dichloride, racemic-ethylene bis(1-indenyl)zirconium (IV) dichloride, racemic-ethylene bis(4,5,6,7-tetrahydro-1-indenyl) zirconium (IV) dichloride, racemic-dimethylsilyl bis(1-indenyl)zirconium (IV) dichloride, racemic-dimethylsilyl bis(4,5,6,7-tetrahydro-1-indenyl)zirconium (IV) dichloride, racemic-1,1,2,2-tetramethylsilanylene bis(1-indenyl) zirconium (IV) dichloride, racemic-1,1,2,2-tetramethylsilanylene bis(4,5,6,7-tetrahydro-1-indenyl) zirconium (IV) dichloride, ethylidene (1-indenyl tetramethylcyclopentadienyl)zirconium (IV) dichloride, racemic-dimethylsilyl bis(2-methyl-4-t-butyl-1-cyclopentadienyl)zirconium (IV) dichloride, racemic-ethylene bis(1-indenyl)hafnium (IV) dichloride, racemic-ethylene bis(4,5,6,7-tetrahydro-1-indenyl)hafnium (IV) dichloride, racemic-dimethylsilyl bis(1-indenyl)hafnium (IV) dichloride, racemic-dimethylsilyl bis(4,5,6,7-tetrahydro-1-indenyl)hafnium (IV) dichloride, racemic-1,1,2,2-tetramethylsilanylene bis(1-indenyl)hafnium (IV) dichloride, racemic-1,1,2,2-tetramethylsilanylene bis(4,5,6,7-tetrahydro-1-indenyl)hafnium (IV), dichloride, ethylidene (1-indenyl-2,3,4,5-tetramethyl-1-cyclopentadienyl)hafnium (IV) dichloride, racemic-ethylene bis(1-indenyl)titanium (IV) dichloride, racemic-ethylene bis(4,5,6,7-tetrahydro-1-indenyl)titanium (IV) dichloride, racemic-dimethylsilyl bis(1-indenyl)titanium (IV) dichloride, racemic-dimethylsilyl bis(4,5,6,7-tetrahydro-1-indenyl)titanium (IV) dichloride, racemic-1,1,2,2-tetramethylsilanylene bis(1-indenyl) titanium (IV) dichloride racemic-1,1,2,2-tetramethylsilanylene bis(4,5,6,7-tetrahydro-1-indenyl) titanium (IV) dichloride, and ethylidene (1-indenyl-2,3,4,5-tetramethyl-1-cyclopentadienyl)titanium IV)dichloride.

Particularly preferred metallocene catalysts have one of the following formulas (III or IV):

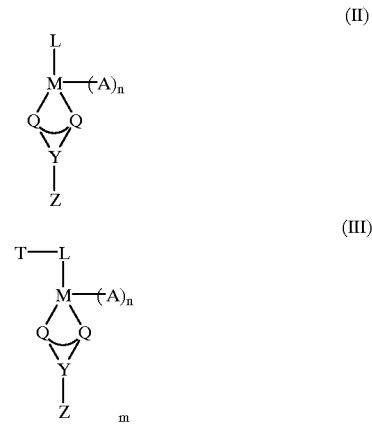

wherein:

M is a metal from groups IIIB to VIII, preferably Zr or Hf;

L is a substituted or unsubstituted, □π-bonded ligand coordinated to M, preferably a substituted cycloalkadienyl ligand;

each Q is independently selected from the group consisting of —O—, —$NR^3$—, —$CR^3_2$— and —S—, preferably oxygen;

Y is either C or S, preferably carbon;

Z is selected from the group consisting of —$OR^3$, —$NR^3_2$, —$CR^3_3$, —$SR^3$, —$SiR^3_3$, —$PR^3_2$, and —H, with the proviso that when Q is —$NR^3$— then Z is selected from the group consisting of —$OR^3$, —$NR^3_2$, —$SR^3$, —$SiR^3_3$, —$PR^3_2$, and —H, preferably Z is selected from the group consisting of —$OR^3$, —$CR^3_3$, and —$NR^3_2$;

n is 1 or 2;

A is a univalent anionic group when n is 2 or A is a divalent anionic group when n is 1, preferably A is a carbamate, carboxylate or other heteroallyl moiety described by Q, Y and Z combination; and each $R^3$ is independently a group containing carbon, silicon, nitrogen, oxygen, and/or phosphorus and one or more $R^3$ groups may be attached to the L substituent, preferably R³ is a hydrocarbon group containing from 1 to 20 carbon atoms, most preferably an alkyl, cycloalkyl or an aryl group;

T is a bridging group selected from the group consisting of alkylene or arylene groups containing from 1 to 10 carbon atoms optionally substituted with carbon or heteroatoms, germanium, silicone and alkyl phosphine; and m is 1 to 7, preferably 2 to 6, most preferably 2 or 3.

The supportive substituent formed by Q, Y and Z is a unicharged polydentate ligand exerting electronic effects due to its high polarizability, similar to the cyclopentadienyl group. In the most preferred embodiments of this invention, the disubstituted carbamates of formula (IV),

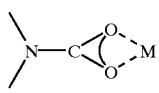

(IV)

and the carboxylates of formula (V)

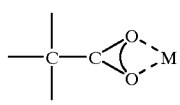

(V)

are employed.

Examples of metallocene catalysts according to formulas II and III include indenyl zirconium tris(diethylcarbamate), indenyl zirconium tris(pivalate), indenyl zirconium tris(p-toluate), indenyl zirconium tris(benzoate), (1-methylindenyl)zirconium tris(pivalate), (2-methylindenyl)zirconium tris(diethylcarbamate), (methylcyclopentadienyl)zirconium tris(pivalate), cyclopentadienyl tris(pivalate), and (pentamethylcyclopentadienyl)zirconium tris(benzoate). Preferred examples of these metallocene catalysts include indenyl zirconium tris(diethylcarbamate) and indenyl zirconium tris(pivalate).

Another type of metallocene catalyst that can be used in accordance with the invention is a constrained geometry catalyst of the formula (VI):

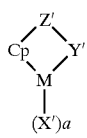

(VI)

wherein:

M is a metal of Group IIIB to VIII of the Periodic Table of the Elements:

Cp is a cyclopentadienyl or substituted cyclopentadienyl group bound in an $\eta^5$ bonded mode to M;

Z' is a moiety comprising boron, or a member of Group IVB of the Periodic Table of the Elements and optionally sulfur or oxygen, the moiety having up to 20 non-hydrogen atoms, and optionally Cp and Z' together form a fused ring system;

X' is an anionic ligand group or a neutral Lewis base ligand group having up to 30 non-hydrogen atoms;

a is 0, 1, 2, 3 or 4 depending on the valance of M; and

Y' is an anionic or non-anionic ligand group bonded to Z' and M comprising is nitrogen, phosphorus, oxygen or sulfur having up to 20 non-hydrogen atoms, and optionally Y' and Z' together form a fused ring system.

Constrained geometry catalysts are well known to those skilled in the art and are disclosed in, for example, U.S. Pat. Nos. 5,026,798 and 5,055,438 and published European Application No. 0 416 815 A2, the disclosures of which are incorporated by reference herein in their entirety.

Illustrative but non-limiting examples of substituents Z', Cp, Y', X' and M in formula V are:

| Z' | Cp | Y' | X' | M |
|---|---|---|---|---|
| dimethylsilyl | cyclopentadienyl | t-butylamido | chloride | titanium |
| methylphenylsilyl | fluorenyl | phenylamido | methyl | zirconium |
| diphenylsilyl | indenyl | cyclohexylamido | | hafnium |
| tetramethylethylene | | oxo | | |
| ethylene | tetramethylcyclopentadienyl | | | |
| diphenylmethylene | | | | |

Another preferred group of metallocene catalysts useful in the present invention are those having the following formula.

$$(L)_2 R^1 M X_{(z-2)} \quad \quad (VII)$$

wherein M is a metal from groups III to VIII or a rare earth metal of the Periodic Table; L is π-bonded substituted indenyl ligand coordinated to M; R¹ is a bridging group selected from the group consisting of C₁–C₄ substituted or unsubstituted alkylene radicals, dialkyl or diaryl germanium or silicon groups, and alkyl or aryl phosphine or amine radicals; each X is independently hydrogen, an aryl, alkyl, alkenyl, alkylaryl, or arylalkyl radical having 1–20 carbon atoms, a hydrocarboxy radical having 1–20 carbon atoms, a halogen, NR²₂—, R²CO₂—, or R²₂NCO₂—, wherein each R² is a hydrocarbyl group containing 1 to about 20 carbon atoms; and z is the valence state of M.

Illustrative, but non-limiting, examples of this group of metallocenes include bridged dialkyl indenyl metallocenes [e.g., (indenyl)₂M(CH₃)₂, (indenyl)₂M(C₆H₅)₂, (indenyl)₂M di-neopentyl, (indenyl)₂M di-benzyl]; bridged mono alkyl bisindenyl metallocenes, [e.g., (indenyl)₂M (CH₃)Cl, (indenyl)₂M neopentyl Cl, (indenyl)₂MC₆H₅Cl], indenyl metal di-halide complexes [e.g., indenyl₂MCl₂, tetra-methylindenyl₂MCl₂, tetra-ethylindenyl₂MCl₂, bis(2, 4dimethyl-indenyl)MCl₂]; bisfluorenyl structures [e.g., bisfluorenylMCl₂, bis-nona methyl fluorenylMCl₂, bis-1-methyl fluorenylMCl₂]; with the following bridging groups (i.e., R in the above formula I): Me₂Si, Et₂Si, Ph₂Si, MePhSi, MeEtSi, EtPhSi, Me₂Ge, Et₂Ge, Ph₂Ge, MePhGe, MeEtGe, MeCH, Me₂C, Et₂C, Ph₂C, MePhC, MeEtC, EtPhC, iPr₂C, t-Bu₂C, ethylene, tetramethylethylene, diphenyl ethylene, methyl ethylene, propylene, methylamine, butylene, and methyl phosphine.

Particularly preferred for use herein are compounds selected from racemic-dimethylsilylbis(2-methyl-1-indenyl) zirconium dichloride ("SIZR2"), racemic-dimethylsilylbis (2-methyl-47-(1-naphthyl)indenyl)zirconium dichloride ("SIZR4N") and racemic-dimethylsilylbis(2-methyl-4-phenyl-1-indenyl)zirconium dichloride ("SIZR4P").

The invention is also useful with another class of single site catalyst precursors, di(imine) metal complexes, as described in PCT Application No. WO 96/23010. Such di(imine) metal complexes are transition metal complexes of bidentate ligands selected from the group consisting of:

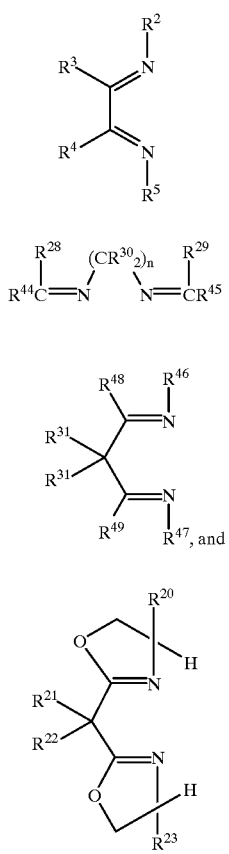

wherein said transition metal is selected from the group consisting of Ti, Zr, Sc, V, Cr, a rare earth metal, Fe, Co, Ni, and Pd;

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl, or $R^3$ and $R^4$ taken together are hydrocarbylene or substituted hydrocarbylene to form a carbocyclic ring;

$R^{44}$ is hydrocarbyl or substituted hydrocarbyl, and $R^{28}$ is hydrogen, hydrocarbyl or substituted hydrocarbyl or $R^{44}$ and $R^{28}$ taken together form a ring;

$R^{45}$ is hydrocarbyl or substituted hydrocarbyl, and $R^{29}$ is hydrogen, substituted hydrocarbyl or hydrocarbyl, or $R^{45}$ and $R^{29}$ taken together form a ring;

each $R^{30}$ is independently hydrogen, substituted hydrocarbyl or hydrocarbyl, or two of $R^{30}$ taken together form a ring;

each $R^{31}$ is independently hydrogen, hydrocarbyl or substituted hydrocarbyl;

$R^{46}$ and $R^{47}$ are each independently hydrocarbyl or substituted hydrocarbyl, provided that the carbon atom bound to the imino nitrogen atom has at least two carbon atoms bound to it;

$R^{48}$ and $R^{49}$ are each independently hydrogen, hydrocarbyl, or substituted hydrocarbyl;

$R^{20}$ and $R^{23}$ are independently hydrocarbyl or substituted hydrocarbyl;

$R^{21}$ and $R^{22}$ are independently hydrogen, hydrocarbyl or substituted hydrocarbyl; and n is 2 or 3;

and provided that:
said transition metal also has bonded to it a ligand that may be displaced by or added to the olefin monomer being polymerized; and
when the transition metal is Pd, said bidentate ligand is (IX), (X) or (XI).

The activating cocatalyst typically is capable of activating the metallocene catalyst. Preferably, the activating cocatalyst is one of the following: (a) branched or cyclic oligomeric poly(hydrocarbyl-aluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula $[A^+][BR^{}_4{}^-]$, where $A^+$ is a cationic Lewis or Bronsted acid capable of abstracting an alkyl, halogen, or hydrogen from the metallocene catalysts, B is boron, and R is a substituted aromatic hydrocarbon, preferably a perfluorophenyl radical; and (c) boron alkyls of the general formula $BR^{}_3$, where R is as defined above.

Preferably, the activating cocatalyst is an aluminoxane such as methylaluminoxane (MAO) or modified methylaluminoxane (MMAO), or a boron alkyl. Aluminoxanes are preferred and their method of preparation is well known in the art. Aluminoxanes may be in the form of oligomeric linear alkyl aluminoxanes represented by the formula (XII):

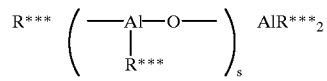

or oligomeric cyclic alkyl aluminoxanes of the formula (XIII):

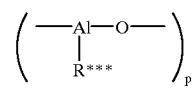

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of MAO, R* is methyl, whereas in MMAO, R* is a mixture of methyl and C2 to C12 alkyl groups wherein methyl comprises about 20 to 80 percent by weight of the R* group.

The amount of activating cocatalyst and metallocene catalyst usefully employed in preparation of the catalyst composition can vary over a wide range. When the cocatalyst is a branched or cyclic oligomeric poly(hydrocarbylaluminum oxide), the mole ratio of aluminum atoms contained in the poly(hydrocarbylaluminum oxide) to metal atoms contained in the metallocene catalyst is generally in the range of from about 2:1 to about 100,000:1, preferably in the range of from about 10:1 to about 10,000:1, and most preferably in the range of from about 50:1 to about 2,000:1. When the cocatalyst is an ionic salt of the formula [A$^+$][BR$^*_4{}^-$] or a boron alkyl of the formula BR$^*_3$, the mole ratio of boron atoms contained in the ionic salt or the boron alkyl to metal atoms contained in the metallocene catalyst is generally in the range of from about 0.5:1 to about 10:1, preferably in the range of from about 1:1 to about 5:1.

The liquid preactivated unsupported catalyst can be composed of one or more metal compounds (i.e., unsupported catalyst) in combination with one or more co-catalysts. Alternatively, a portion of the co-catalyst can be fed separately from the metal compound(s) to the reactor. Promoters associated with any particularly polymerization are usually added to the reactor separately from the co-catalyst and/or metal compound(s).

If the metal compound and/or the co-catalyst occurs naturally in liquid form, it can be introduced "neat" into the reactor. More likely, the liquid catalyst is introduced into the reactor as a solution (single phase, or "true solution" using a solvent to dissolve the mixture of the metal compound and the co-catalyst), an emulsion (partially dissolving the catalyst components in a solvent), suspension, dispersion, or slurry (each having at least two phases). Preferably, the liquid catalyst employed is a solution or an emulsion, most preferably a solution. As used herein, "liquid catalyst" or "liquid form" includes neat, solution, emulsion, and dispersions of the transition metal or rare earth metal component (s) of the catalyst and/or co-catalyst.

The solvents that can be utilized to form solutions of the mixture of the preactivated unsupported olefin polymerization catalyst precursor compounds and co-catalyst (i.e., the preactivated unsupported catalyst) are inert solvents, preferably non-functional and non-coordinating hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cycloctane, norbornane, ethylcyclohexane and the like; aromatic hydrocarbons such as benzene, toluene, ethylbenzene, propylbenzene, butylbenzene, xylene, tetrahydrofuran and the like; and petroleum fractions such as gasoline, kerosene, light oils, and the like. Likewise, halogenated solvents such as methylene chloride, chlorobenzene, and the like may also be utilized. The use of the term "inert" in this context is meant that the material being referred to is non-deactivating in the polymerization reaction zone under the conditions of gas phase polymerization and is non-deactivating with the catalyst in or out of the reaction zone. The use of the expression "non-functional" or "non-coordinating" denotes solvents that do not contain groups such as strong polar groups which can deactivate the active catalyst metal sites.

Although aromatic and halogenated solvents can be used in the context of the present invention, and are capable of dissolving unsupported catalysts that are insoluble or only slightly soluble in hydrocarbon solvents, it is preferred to avoid using such solvents for environmental reasons. Naturally, if one is not concerned with the generation of volatile aromatics and/or halogen-containing components, or if one devises a mechanism to dispose (or reduce them to non-toxic components) of them safely, then these solvents can be used. Most preferably, a solvent that is compatible with the particular solvent that is used is the solvent used to solvate the cocatalyst. In the case of MMAO, this particular co-catalyst is available from Akzo-Nobel Chemicals, Inc. as a 1.91 Molar solution in heptane, 7.2 wt. % aluminum, and when used as the co-catalyst, it is preferred that a solvent that is compatible with heptane (heptane, hexane, isopentane, etc.) is used as the solvent.

Additional solvents typically are added to the mixture of the unsupported catalyst and the co-catalyst to reduce the concentration of the preactivated unsupported catalyst. Any additional solvent can be used in the context of the present invention. Again, aromatic and/or halogen-containing solvents can be used, but it is preferred to avoid the use of these solvents for environmental reasons. Preferably, the additional solvent is an aliphatic or alicyclic hydrocarbon solvent, more preferably, the additional solvent is selected from butane, isobutane, ethane, propane, pentane, isopentane, hexane, heptane, octane, decane, dodecane, hexadecane, octadecane, and most preferably, the additional solvent is isopentane, hexane or heptane.

The size of the droplets formed when introducing the catalyst system into the reactor is generally determined by the manner and place in which the catalyst is introduced. It is desirable to use a means of introduction which is able to provide liquid droplets in the reactor having an average diameter which is in the range of from about 0.1 to about 1000 microns, preferably within a range of 0.1 to 500 microns, most preferably ranging from about 1 to 150 microns. A narrow distribution of droplet size in a lower or mid range of about 10 to about 100 microns can prevent the formation of large agglomerates resulting from large droplets and the formation of fines resulting from small droplets. Under many conditions, however, a wide droplet size distribution is acceptable as the smaller droplets can agglomerate to some degree with the resin in the reactor and large droplets can form larger particles of up to 0.25 which can be readily fluidized as long as the particle fraction is low enough, preferably less than 10% and more preferably less than 2% by weight of the total resin in the bed.

The catalyst in liquid form may be introduced into the reaction zone by simply passing the catalyst, under the impetus of pressure, through a conduit extending into the reactor, which may be assisted by an inert gas (such as nitrogen) and/or an inert liquid (such as isopentane, propane, and the like) to aid in atomization so as to provide the desired liquid droplet size. The catalyst in liquid form may be introduced by conventional means such as, for example, using positive displacement pumps, pressurizing the holding tank with an inert gas, and the like. The extent of pressurization, the diameter of the conduit, the type and size of atomization nozzle (if one is used), the velocity with which the catalyst is introduced into the reactor, the superficial gas velocity of the fluids within the reactor, as well as the pressure within the reaction zone will all influence the liquid droplet size that is formed. Using the guidelines provided herein, those skilled in the art are capable of varying one or more of these parameters to the extent desired while adjusting others to obtain a desired droplet size within the reaction zone.

Generally, the catalyst in liquid form is introduced into the reactor by means of a conventional two fluid spray nozzle in which an inert gas is used to help atomize the catalyst. The use of such a spray nozzle allows for greater control of the liquid droplet size that is produced in the reaction zone by providing enhanced atomization capability. The selection of a particular spray nozzle/tip for use with the catalyst in liquid form to provide a desired average droplet size, taking into account the reaction conditions within the reactor as well as the flow rate of the catalyst, is within the knowledge of those skilled in the art. Generally, the orifice diameter in the spray nozzle/tip is in the range of from about 0.01 to about 0.15 inch, preferably from about 0.02 to about 0.05 inch.

The average particle size of the polyolefin produced in the presence of the preactivated unsupported catalyst can be controlled by adjusting the size of the liquid droplets containing preactivated unsupported catalyst, or the concentration of preactivated unsupported catalyst in the liquid droplets, or both. If both the size of the liquid droplets and the preactivated unsupported catalyst concentration in the liquid droplets are adjusted, they may be adjusted simultaneously or in sequence.

The nature of both the unsupported catalyst and the activating cocatalyst determine the magnitude and direction in which the size of the liquid droplets and the preactivated unsupported catalyst concentration in the liquid droplets should be adjusted in order to achieve a given average polyolefin product particle size. Typically, for a catalyst system comprising unsupported metallocene catalyst and liquid aluminoxane cocatalyst in a solvent (or solvent mixture) having a given density, used to produce an ethylene copolymer without severe agglomeration, the average particle size of the ethylene copolymer may be increased or decreased by about 10% by adjusting the size of the liquid droplets by about 10% or adjusting the preactivated unsupported catalyst concentration in the liquid droplets (i.e., in the total liquid feedstream of unsupported catalyst, cocatalyst, solvent(s), etc.) by about 33%. Preferably, the average particle size of an ethylene copolymer so made may be increased or decreased by about 20% by adjusting the size of the liquid droplets by about 20% or adjusting the preactivated unsupported catalyst concentration by about 40%. For conditions where an increase in liquid droplet size leads to an increased rate of particle agglomeration, a 10% increase in liquid droplet size can lead to a 50% or more increase in ethylene copolymer average particle size. Under such conditions, diluting the catalyst in the liquid feedstream by 33% can decrease the ethylene copolymer average particle size by 50% or more. The same polyolefin size control achieved above with respect to ethylene (co)polymers can also be achieved for propylene (co)polymers.

The average diameter of the liquid droplets is generally in the range of about 0.1 to about 1000 micrometers, preferably 1 to 300 micrometers, most preferably about 10 to 75 micrometers.

The size, i.e., average diameter, of the liquid droplets may be adjusted in one of several ways. For example, the flow rate of the liquid feedstream of preactivated unsupported catalyst, cocatalyst, solvent(s), etc. may be increased in order to increase the size of the liquid droplets, or decreased to decrease the size of the liquid droplets. Alternatively, when the liquid droplets of unsupported catalyst are introduced into the reactor with the aid of an inert carrier gas such as nitrogen, argon, alkane, or mixtures thereof, the flow rate of the inert carrier gas into the polymerization reactor may be increased to break up the liquid into smaller sized droplets, which in turn decreases the average particle size of the polyolefin produced. Alternatively, the flow rate of the inert carrier gas may be decreased, allowing the size of the liquid droplets to increase, thereby increasing the average particle size of the polyolefin produced. This is a preferred method of adjusting the liquid droplet size, and thereby polyolefin average particle size.

The size of the liquid droplets containing the preactivated unsupported catalyst can be adjusted while using an effervescent spray nozzle, such as that described in copending U.S. application Ser. No. 08/802,231 filed Dec. 19, 1997, now U.S. Pat. No. 5,962,606, for "Improved Control of Solution Catalyst Droplet Size with an Effervescent Spray Nozzle" of Williams, et al. (the disclosure of which is incorporated by reference herein in its entirety) to spray the liquid feedstream containing the unsupported catalyst into the polymerization reactor. In such an effervescent nozzle, a stream of liquid or gas is passed through an inner tube, while a liquid or gas is passed cocurrently through an annular space defined by the inner tube and a concentric outer tube. The direction of flow of the liquid and gas is generally along the central axis of the tubes. The liquid feedstream containing the unsupported catalyst and atomization gas are fed through their respective inlets and exit through a common orifice at the spray tip. Towards the tip of the inner tube, though not necessarily at the end, there are holes (orifices) which allow the gas to enter the liquid. The gas is introduced into the cocurrent flowing liquid near the common exit orifice. In this way, liquid slugging is prevented and steady droplet formation occurs. Gas bubbles which are formed are forced through an orifice at the tip of the outer tube, forcing the concurrent flow of liquid along the outside edge of the orifice. The thin film of liquid on the orifice wall is ejected from the orifice in thin sheets which disintegrate into small droplets. The gas bubbles are thought to rapidly increase in volume as they emerge form the orifice, providing additional energy which shatters the liquid into small droplets. Using a mathematical model, the size of the liquid droplets containing the unsupported catalyst sprayed from the effervescent nozzle can be readily calculated and adjusted as desired.

The size of the liquid droplets containing the catalyst also can be adjusted while using a perpendicular spray nozzle such as that described in copending U.S. application Ser. No. 08/803,230 filed Feb. 19, 1997, now U.S. Pat. No. 6,075, 101, entitled "Improved Control of Solution Catalyst Droplet Size with a Perpendicular Spray Nozzle" of Williams, et al. (the disclosure of which is incorporated by reference herein in its entirety), to spray the liquid containing the unsupported catalyst into the polymerization reactor. Such a perpendicular nozzle comprises a tube for delivering the liquid feedstream containing the preactivated unsupported catalyst wherein there is an inlet end for the input of the liquid, and optionally, a gas. The other end of the tube (i.e., "distal end") wherein there is at least one exit hole (orifice) which is at least 10–20°, preferably more than 45°, and most preferably 60 to 90°, off from the direction of flow of the liquid within the nozzle (i.e., from the central axis of the tube), where the orifice is located towards the distal end of the nozzle. Said nozzle may have any number of orifices and may include a gas stream within the liquid feedstream. There is no need for a separate mixing chamber for the gas and liquid within the nozzle.

The distal end of the nozzle may be of any geometric configuration, e.g., bulbous, rounded, parabolic, conical, or semi-circular, but to limit turbulence the nozzle preferably is tapered at about 5 to 15 degrees off horizontal (the central axis of the tube). Higher taper angles can be tolerated given that the taper from horizontal is gradual. A tapered tip also minimizes fouling because of the small area available for accumulation of catalyst and polymer.

For perpendicular spraying, the liquid feedstream may be atomized with an inert carrier gas, as is done with a gas-assisted perpendicular spray nozzle. Alternately, a perpendicular pressure nozzle could be used to deliver a perpendicular spray of high-pressure liquid in the absence of an atomizing gas. Additionally, the perpendicular feeding geometry can be used with effervescent gas-liquid contact in the spraying nozzle or with an ultrasonic nozzle, or could also be applied to other known atomization devices, such as electrostatic, sonic-whistle, or rotary, etc. nozzles.

Preferably, the preactivated unsupported catalyst in liquid form is introduced intermittently or continuously into the reaction zone at a desired point above the distributor plate.

Intermittent catalyst feeding may be used to help keep the catalyst solution flow rate in the proper range for optimum nozzle performance while independently maintaining the desired average catalyst feed rate. It is desirable to maintain a continuous flow of the inert carrier through the nozzle, be it a liquid or gas, at a rate sufficient to prevent fouling of the injection nozzle. Conventional metering valves or pumps can be used to deliver a precise flow of the catalyst to the reaction zone. Controlled intermittent catalyst flow may be delivered to the reaction zone using conventional syringe or positive displacement pumps.

Most preferably, the liquid preactivated unsupported catalyst is fed to the reactor in a "resin lean particle zone," as described in U.S. Pat. No. 5,693,727. A resin particle lean zone can be established in the reactor by feeding the liquid preactivated unsupported catalyst in any manner such that the catalyst droplets do not immediately contact a substantial portion of the resin particles of the fluidized bed. The droplets of the preactivated unsupported catalyst in liquid form are introduced without immediately contacting growing polymer particles of the bed so as to provide an average polymer particle size (APS) ranging from about 0.01 to about 0.06 inches. Generally, the particle density in the particle lean zone is at least 10 times lower than that in the fluidized bed.

As disclosed in U.S. Pat. No. 5,317,036, a liquid, unsupported catalyst is typically dispersed in a solvent such as isopentane and introduced into the fluidized bed using an inert carrier gas such as nitrogen. In the time period elapsing between when the liquid catalyst in droplet form leaves the nozzle and when the liquid catalyst contacts the particles in the bed, new polymer particles are formed. In the present invention, the time between the droplet leaving the nozzle and its contacting the particles in the bed ranges from about 0.01 seconds to 60 seconds, preferably about 0.01 to 30 seconds, and, most preferably, is about 0.01 seconds to 5 seconds.

A particle lean zone may be a section of the reactor which normally does not contain the fluidized bed, such as the disengaging section, the gas recirculation system, or the area below the distributor plate. The particle lean zone may also be created by deflecting resin away from the catalyst spray with a stream of gas.

In a preferred embodiment of the present invention, the liquid preactivated unsupported catalyst is present in a carrier gas (e.g., nitrogen, argon, other inert gases, alkane, or mixtures thereof), and is surrounded by at least one gas which serves to move or deflect resin particles of the bed out of the path of the liquid catalyst as it enters the fluidization zone and away from the area of catalyst entry, thereby providing a particle lean zone. In a particularly preferred embodiment, the liquid preactivated unsupported catalyst in the carrier gas is surrounded by at least two gases, the first gas serving primarily to deflect resin particles of the bed out of the path of the liquid catalyst and the second gas primarily prevents the injection tube or nozzle tip from getting clogged. As used throughout this description, when the liquid preactivated unsupported catalyst in the carrier gas is surrounded by two gases, the catalyst is considered to be shrouded. The first or particle-deflecting gas and the second or tip-cleaning gas can each be selected from the group consisting to recycle gas, monomer gas, chain transfer gas (e.g., hydrogen), inert gas or mixtures thereof. Preferably the particle-deflecting gas is all or a portion of the recycle gas and the tip-cleaning gas is all or a portion of a monomer (e.g., ethylene or propylene) employed in the process.

Liquid preactivated unsupported catalyst in a carrier gas, particle-deflecting gas, and, when employed, the tip-cleaning gas can be introduced into the reactor at the same velocities to establish a particle lean zone. However, it is preferred that they enter the fluidization zone at differing velocities. Preferably, the liquid preactivated unsupported catalyst in the carrier gas is introduced at a velocity ranging from about 50 ft/sec to about 500 ft/sec; the particle-deflecting gas is introduced at a velocity ranging from about 10 ft/sec to about 280 ft/sec, and, when employed, the tip-cleaning gas ranges in velocity from about 50 ft/sec to about 250 ft/sec. Preferably, the pressure of the particle-deflecting gas, and, when employed, the tip-cleaning gas is about 10 to about 300 psig, preferably about 20 to about 200 psig, higher than the pressure of the gas in the fluidization zone of the reactor. Typically, the particle-deflecting gas pressure ranges from about 50 to about 600 psig; the tip-cleaning gas pressure, when employed, ranges from about 50 to 600 psig; and the liquid catalyst/carrier gas pressure ranges from about 50 to about 600 psig. When the particle-deflecting gas is the recycle gas, it is a portion comprising about 5 to about 40 percent of the total recycle flow and is preferably removed from the discharge side of the compressor. When the tip-cleaning gas is the monomer gas, it is a portion comprising about 2 to about 40 percent of the total monomer flow. The particle-deflecting gas and the tip-cleaning gas can also optionally contain one or more antifoulants or antistatic agents known to those skilled in the art. While inert gases can be employed in the present invention as the particle-deflecting and tip-cleaning gases, they can be impractical because they require increased reactor venting, thereby decreasing efficiency of monomer usage and increasing cost.

Preactivated unsupported liquid catalyst can be introduced into the polymerization zone from the side, top, or bottom of the reactor. Side feeding the liquid catalyst is generally preferred, since it requires no or little modification of a conventional commercial reactor. When the liquid preactivated unsupported catalyst is fed from a side location into the fluidization or polymerization zone of the reactor, it, along with the particle-deflecting gas and optional tip-cleaning gas, preferably enters the bed from a position that is about 10 percent to about 40 percent of the distance from the distributor plate to the top of the bed, most preferably about 15 percent to about 25 percent of the distance from the distributor plate to the top of the bed. When the liquid, preactivated unsupported catalyst is fed from the bottom of the reactor along with the particle-deflecting gas and optional tip-cleaning gas, it preferably enters the fluidized bed from a position that is at or near the center of the distributor plate in the bottom of the reactor to provide a particle lean zone. When the liquid preactivated unsupported catalyst is introduced from a location in the top of the reactor, it is preferred that it enter in such a manner so as to avoid polymerization in the expanded zone of the reactor, and, therefore, is released in the reactor at the top or just immediately above the fluidized bed. This allows the catalyst droplets to additionally coat fines which can accumulate as dust above the top of the fluidized bed.

Any catalyst delivery system that is capable of atomizing the liquid catalyst into droplets of the desired size and distribution and avoids plugging of the tip or nozzle can be employed in the present invention. One embodiment of a catalyst delivery system comprises a particle-deflecting gas tube enclosing an optional tip-cleaning gas tube which in turn encloses a catalyst injection tube. The particle-deflecting gas tube has a sufficient inside diameter for the insertion or mounting of the tip-cleaning gas tube. For a commercial fluidized bed reactor, typically the particle-deflecting gas tube has an inside diameter ranging from about 2 inches to about 12 inches, preferably about 4 to about 6 inches. The optional tip-cleaning gas tube, has an outside diameter capable of fitting inside the particle-deflecting gas tube. For a conventional reactor, typically the tip-cleaning gas tube has an inside diameter ranging from about 0.5 inches to about 1.5 inches, preferably about 0.75 to about 1.25 inches.

The particle-deflecting gas tube can be flush with the inside wall of the reactor or lead edge (top surface) of the distributor plate, or, preferably, it can be extended beyond the inside wall of the reactor or lead edge of the distributor plate into the fluidization zone. Preferably the particle-deflecting gas tube is flush with the inside wall or top of the distributor plate. When employed, the tip-cleaning gas tube can be positioned flush with, extended beyond, or recessed in the particle-deflecting gas tube. Preferably the tip-cleaning gas tube is flush with or recessed in the particle-deflecting gas tube. Most preferably the tip-cleaning gas tube is flush with the particle-deflecting gas tube.

The catalyst injection tube or nozzle can be housed within the particle-deflecting gas tube, but is preferably housed within the tip-cleaning gas tube which is inside the particle-deflecting gas tube. Preferably the catalyst injection tube or nozzle is tapered at its tip to a fine or knife edge to minimize surface area for injector fouling and convenient entry to the reactor vessel. The catalyst injection tube or nozzle is secured or anchored to the inner wall of the particle-deflecting gas tube or preferably to the tip-cleaning gas tube by means of one or more fins or flanges. Stainless steel injection tubing and pneumatic spray nozzles are commercially available in a wide range of internal diameters and thicknesses such that tubing or nozzle size can easily be matched to the amount of catalyst solution feed. For a commercial-size fluidized bed reactor, tubing and nozzles having about a ⅛-inch inside diameter are employed. The orifice diameter in the spray nozzle tip is in the range of from about 0.01 inch to about 0.25 inch, preferably from about 0.02 inch to about 0.15 inch. The orifice diameter of the tip of the injection tube is between about 0.05 inch to about 0.25 inches, preferably between about 0.1 inch to about 0.2 inches. Suitable nozzles can be obtained from Spraying Systems Corporation (Wheaton, Ill.) and can include the ⅛ JJ Series having standard and customized configurations. For a given liquid preactivated unsupported catalyst and reactor polymerization conditions, the catalyst liquid feed rates and the carrier gas and optional tip-cleaning gas feed rates can be adjusted by one skilled in the art to obtain the desired droplet size and distribution, using the guidelines provided herein. The catalyst injection tube or nozzle can be located flush, extended, or recessed with respect to the leading tip edge of the particle-deflecting gas tube and/or optional tip-cleaning gas tube.

In the absence of the tip-cleaning gas tube, the catalyst injection tube or nozzle can be located flush, extended, or recessed with respect to the leading tip edge of the particle-deflecting gas tube. Preferably the catalyst injection tube or nozzle is located flush or extended with respect to the leading tip edge of the particle-deflecting gas tube in the absence of the tip-cleaning gas tube. Most preferably it is located flush in the particle-deflecting gas tube. When a tip-cleaning gas tube is employed in conjunction with the particle-deflecting gas tube, the catalyst injection tube or nozzle is extended beyond the leading edge of the tip-cleaning gas tube or flush with the leading edge to the tip-cleaning gas tube. Preferably, the catalyst injection tube or nozzle is extended 2 to 4 inches beyond the leading edge of the tip-cleaning gas tube, but recessed with respect to the particle-deflecting gas tube.

The liquid preactivated unsupported catalysts of the present invention are preferably prepared by contacting the unsupported catalyst with a co-catalyst, or co-activator for a period of time sufficient to preactivate the catalyst. Simply contacting the two components in a feed line with a residence time of up to about 10 minutes, or contacting the components in a mixing tee, or in a holding tank prior to adding the solution to a gas phase reactor is not sufficient. Rather, the components need to be in contact with one another for a period of time sufficient to preactivate the unsupported catalyst. For example, SIZR4P and MMAO are known to be an effective unsupported catalyst/co-catalyst system for polymerizing olefin monomers. It also is known that SIZR4P is either insoluble, or only slightly soluble in hydrocarbon and, consequently, it typically is dissolved in toluene or methylene chloride. Even in methylene chloride, the solubility of SIZR4P is less than 21 mmol/l at room temperature. When SIZR4P and MMAO are contacted with one another in the presence of hydrocarbon, like heptane, the initial solution is yellow to yellow-orange. After sufficient contact time has passed, typically more than 10 minutes, preferably more than 20 minutes, and most preferably, more than 30 minutes, the solution turns orange-red to deep red.

Other methods can be used to determine the time sufficient to preactivate the unsupported catalyst. The two components can be contacted until all of unsupported catalyst has substantially or completely dissolved in the reaction medium. Determining when the unsupported catalyst is dissolved in the hydrocarbon can be effected visually, or using other visual indicators known in the art. Further, the two components can be contacted with one another for more than two hours.

The unsupported catalyst component and the co-catalyst can be contacted with one another in any vessel, and at any temperature and pressure, so long as a preactivated unsupported catalyst is formed. Preferably, the two components are initially contacted at temperatures within the range of from −20° C. to about 50° C., more preferably, from about −10° C. to about 40° C., even more preferably from about 0–20° C., and most preferably 10–30° C. The pressure before mixing is typically atmospheric to 50 psi, and preferably 15–25 psi.

In accordance with the present invention, the components are added to the catalyst reaction vessel in the following order. The co-catalyst first is added to the preactivation vessel, or reaction vessel, prior to addition of the unsupported catalyst. The co-catalyst usually is added as a diluted solution in a hydrocarbon, for example, as a 5–10 wt % aluminum solution of MAO or MMAO in isopentane or heptane. The unsupported catalyst then is added, preferably as a solid since it is insoluble or only slightly soluble in hydrocarbon solvent, and the components permitted to react with one another. Additional solvent (preferably an aliphatic or alicyclic hydrocarbon solvent) then is added to help dissolve or dilute the components and assist in feeding the preactivated catalyst solution to the gas phase reactor. The solvent, unsupported catalyst and co-catalyst are added in such a manner that produces a preactivated unsupported catalyst whereby the ratio of the aluminum in the co-catalyst to the metal in the unsupported catalyst preferably is within the range of from about 20:1 to about 1500:1. More preferably, the ratio is within the range of from about 900:1 to about 1200:1, and most preferably, the ratio is greater than about 950:1 and less than about 1100:1.

When the components have reacted for a sufficient period of time to produce a preactivated unsupported catalyst, this preactivated unsupported catalyst may be added directly to the gas phase reactor in the form of a slurry or solution. Alternatively, the preactivated unsupported catalyst may be separated from the solution by crystallization, precipitation, filtration, drying, and the like to form a solid catalyst component that can be stored. Of course, the preactivated unsupported catalyst also can be stored in slurry or solution.

The preactivated unsupported catalyst of the invention can be fed directly to a gas phase polymerization reactor, can be stored in solution or slurry, or can be separated from the solution or slurry and stored. It is preferred to add the preactivated unsupported catalyst directly to the gas phase polymerization reactor. It also is preferred to pass the preactivated unsupported catalyst slurry or solution through a filter to filter out any residual solids and/or any non-preactivated unsupported catalyst that may be suspended in the mixture. Most preferably the, preactivated unsupported catalyst solution is passed through a filter having a pore size ranging from about 0.01 to about 50 microns, preferably from about 0.1 to about 20 microns, and more preferably from about 0.5 to about 10 microns. Any filtering medium can be used so long as it is capable of filtering residual solids and/or any non-preactivated unsupported catalyst from the preactivated unsupported catalyst solution. Most preferably, a one micron polypropylene bag filter is used.

In accordance with an additional preferred method of the invention, the reaction vessel used to form the preactivated unsupported catalyst solution is subjected to a co-catalyst passivation step prior to contacting the components. Use of such a co-catalyst passivation is believed to reduce the presence of impurities in the reaction vessel. Co-catalyst passivation can be accomplished by adding the cocatalyst to the vessel and letting it circulate for 2 minutes up to 2 hours, preferably at least 5 minutes. After circulation, the system can be purged, preferably with $N_2$, although other inert materials may be used. After purging is complete, mixing of the cocatalyst and catalyst may commence.

In accordance with the present invention, unsupported olefin polymerization catalysts can be fed to a gas phase reactor in slurry or solution by forming a preactivated unsupported catalyst. The preactivated unsupported catalysts are prepared by first reacting the unsupported catalyst precursor and co-catalyst, and then adding additional solvent. If the unsupported catalyst precursors are added to a solution of co-catalyst and additional solvent (with our without even more solvent added after addition of the unsupported catalyst precursors), then the catalyst injection tube has a tendency to plug, even though the concentrations of the preactivated unsupported catalyst solutions are about the same. The preactivated unsupported catalysts also are even more readily dissolved in aromatic and halogenated solvents, like toluene and methylene chloride. Thus, if these solvents are used as the additional solvent, even less liquid can be fed to the reactor and a more concentrated (concentrated with preactivated unsupported catalyst) solution can be fed without causing plugging, reactor fouling, and the formation of catalyst balls. The present invention provides a highly active unsupported catalyst that is easy to prepare, does not leave undesirable reaction products in the resulting polymer product, reduces reactor fouling, and reduces polymer agglomeration (or formation of catalyst balls) and injection tube plugging. The present invention also provides a method of polymerizing olefin monomers in the gas phase to produce polymers in high yield, and having an excellent balance of properties.

While the invention has been described in detail with reference to particularly preferred embodiments, those skilled in the art will appreciate that various modifications can be made without departing from the spirit and scope thereof. All documents described above are incorporated by reference herein in their entirety.

The following non-limiting examples will illustrate the invention more clearly, but are not intended to limit the present invention.

EXAMPLES

Example 1

A number of samples were prepared whereby SIZR4P was used as the unsupported catalyst precursor. SIZR4P is represented by the following:

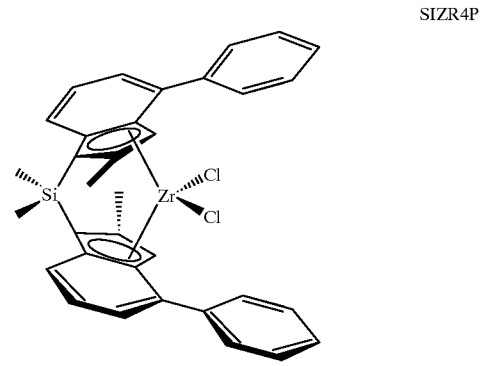

SIZR4P

Numerous samples were prepared by contacting the unsupported catalyst precursor, SIZR4P with modified methylaluminoxane, MMAO, (type 3A, 7.1 wt % Al in heptane, commercially available from Akzo-Nobel Chemicals, Inc.), and in all instances except sample 17, with additional isopentane (iC5) in various orders. In sample 17, toluene was used instead of isopentane. In each of the samples, the SIZR4P was contacted with MMAO in the presence of solvent (in the amount shown as initial concentration) for at least 50 minutes. The amount of solvent added, the initial concentration and final concentration of preactivated unsupported olefin polymerization catalyst are shown in Table 1.

After preparing the preactivated unsupported catalyst composition, additional solvent then was added (except in sample 17 where no additional toluene was added) to bring the composition to its final concentration, and the compositions were fed to a gas phase polymerization reactor via a catalyst injection tube and nozzle having the following dimensions. The catalyst injection tube was standard 3/16" stainless steel tubing, with a wall thickness of 0.035 inches. The length of the tube from the catalyst slurry vessel, where the solution was stored to the reactor was approximately 10–25 feet. The nozzle was a tapered tip made from 1/8 inch tubing where the inside diameter was decreased to 0.041 inches in diameter.

The following criteria were used to evaluate whether the catalyst injection tube and/or nozzle became plugged during polymerization. A stopping in catalyst flow was indicated by an increase in pressure of the catalyst injection line of 5 psig or more for more than 5 minutes. In addition, the valve position of the catalyst carriers (isopentane and nitrogen in this case) was monitored. If the motor valve which controlled these materials needed to be opened further to maintain flow rate, this was also a sign of plugging. If either of these conditions occurred, then there would be a "yes" in the tube plugging column in the table below. To determine whether discrete particles are formed and that the concentration of the preactivated unsupported catalyst is not too low, the resin particle size was measured by sieving the resin. If resin fines were present in the resin (fines are defined as resin particles having an average particle size below 125 microns), this indicated that the solution concentration was high enough to prevent coating of resin particles that results in runaway particle growth. The table below indicates whether the catalyst injection tube was plugged (yes or no) and whether fines were generated (yes or no).

TABLE 1

| Sample | Catalyst Feed (cc/hr) | Isopentane (lb/hr) | N2 Flow (lb/hr) | Initial Conc mmol/l | With IC5 new Conc | Tube plugs | Resin Fines ? |
|---|---|---|---|---|---|---|---|
| 1 | 55 | 1 | 7.4 | 0.787 | 0.058 | no | yes |
| 2 | 75 | 1.5 | 7.5 | 0.808 | 0.055 | no | yes |
| 3 | 100 | 1.5 | 7.9 | 0.808 | 0.071 | no | yes |
| 4 | 80 | 2.1 | 6.9 | 0.789 | 0.041 | no | no |
| 5 | 120 | 2.2 | 8 | 0.789 | 0.058 | yes | no |
| 6 | 60 | 2.1 | 8 | 0.792 | 0.032 | yes | no |
| 7 | 60 | 0.75 | 6 | 0.85 | 0.074 | yes | yes |
| 8 | 200 | 1.97 | 6.5 | 0.85 | 0.1052 | yes | yes |
| 9 | 70 | 1.91 | 7.13 | 0.791 | 0.040 | yes | yes |
| 10 | 80 | 2 | 6 | 0.789 | 0.043 | no | yes |
| 11 | 120 | 2 | 6.7 | 0.646 | 0.052 | yes | no |
| 12 | 120 | 2 | 6.7 | 0.646 | 0.052 | yes | no |
| 13 | 100 | 2.1 | 8.6 | 0.647 | 0.042 | no | no |
| 14 | 110 | 3 | 6 | 0.647 | 0.033 | no | no |
| 15 | 110 | 3 | 7 | 0.673 | 0.034 | no | no |
| 16 | 150 | 5.7 | 7 | 0.650 | 0.024 | no | no |
| 17 | 35 | 0 | 5.5 | 0.699 | 0.699 | no | yes |

As can be seen from Table 1, when an aliphatic solvent like isopentane is used, the concentration of the preactivated unsupported catalyst preferably is above 0.04 to not only result in preventing plugging of the injection tube, but also to prevent the agglomeration and aggregation of polymer resin. In addition, when an aromatic solvent like toluene is used, additional solvent need not be added, and the concentration of the preactivated unsupported catalyst can be much higher, on the order of about 0.8 mmol/liter or less to provide the same effect.

What is claimed is:

1. A method of making a polymer comprising contacting an α-olefin monomer or monomers under gas-phase polymerization conditions in a gas-phase reactor with a liquid catalyst composition comprising a hydrocarbon solution of (a) an unsupported olefin polymerization catalyst compound and (b) a co-catalyst, characterized in that the hydrocarbon solvent is selected from the group consisting of aliphatic hydrocarbons, alicyclic hydrocarbons and mixtures thereof and the catalyst concentration in said liquid catalyst composition is from 0.04 to 0.1 mMolar and the catalyst compound is selected from the group consisting of racemic-dimethylsilylbis(2-methylindenyl)zirconium dichloride, racemic-dimethylsilylbis(2-methyl-4-(1-naphthyl)indenyl) zirconium dichloride, and racemic-dimethylsilylbis(2-methyl-4-phenylindenyl)zirconium dichloride.

2. The method of claim 1 wherein the co-catalyst is methylalumoxane.

3. The method of claim 1 wherein ethylene, propylene or a mixture thereof is polymerized.

4. The method of claim 1 operated in condensed mode.

5. The method of claim 1 wherein the solvent of the liquid catalyst composition is selected from the group consisting of aliphatic hydrocarbons and mixtures thereof.

6. The method of claim 5 wherein the solvent is selected from the group consisting of heptane, isopentane, isooctane, and mixtures thereof.

* * * * *